A. R. ROSS.
ELECTRIC COOKING STOVE.
APPLICATION FILED JULY 1, 1919.

1,375,801.

Patented Apr. 26, 1921.
2 SHEETS—SHEET 1.

Inventor
Allen R. Ross
By Attorney

A. R. ROSS.
ELECTRIC COOKING STOVE.
APPLICATION FILED JULY 1, 1919.
1,375,801.
Patented Apr. 26, 1921.
2 SHEETS—SHEET 2.
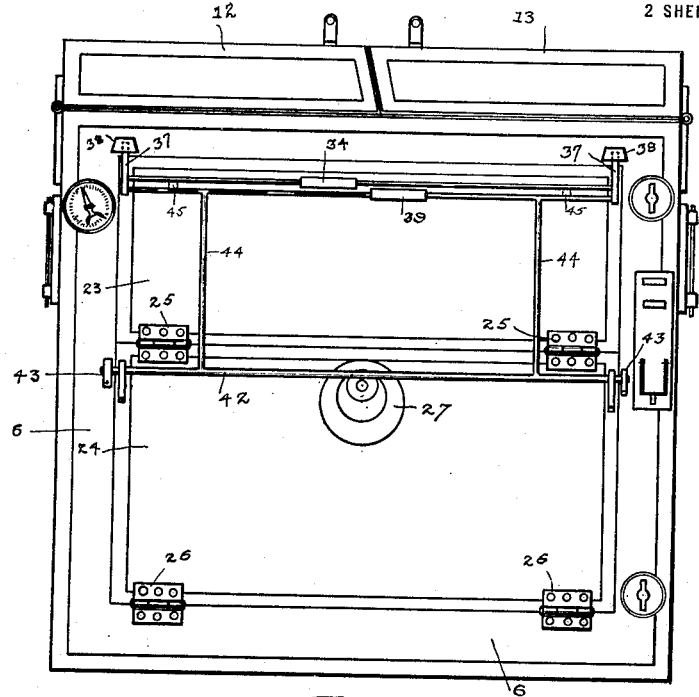
Fig. 3
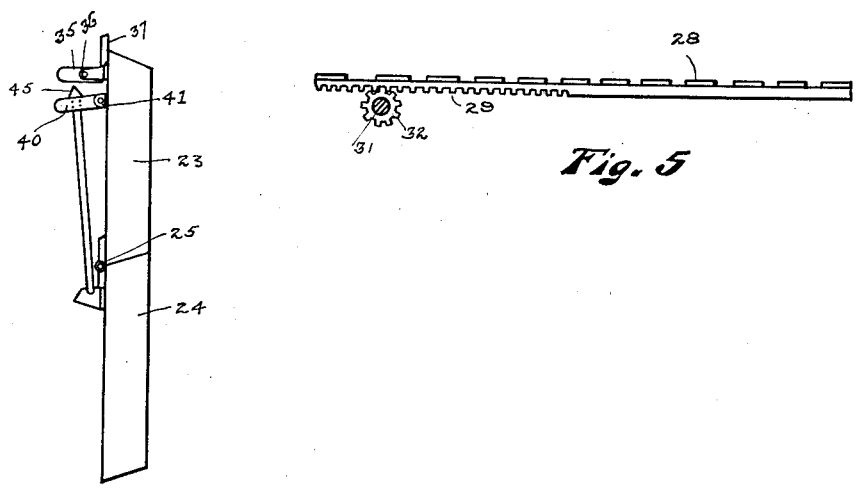
Fig. 4
Fig. 5
Inventor
Allen R. Ross
By Attorney

UNITED STATES PATENT OFFICE.

ALLEN R. ROSS, OF SEATTLE, WASHINGTON.

ELECTRIC COOKING-STOVE.

1,375,801.      Specification of Letters Patent.      Patented Apr. 26, 1921.

Application filed July 1, 1919. Serial No. 307,976.

*To all whom it may concern:*

Be it known that I, ALLEN R. Ross, a citizen of the United States, residing at Seattle, in the county of King and State of Washington, have invented a certain new and useful Electric Cooking-Stove, of which the following is a specification.

My invention relates to the art of electric cooking stoves.

Heretofore, electric cooking stoves for domestic purposes have only very incompletely conserved the heat developed by the electric heating elements, and this defect has rendered their operation costly. One of the primary objects of my invention is to provide an electric cooking stove, simple in design, which affords the maximum conservation of heat. Furthermore, electric stoves as heretofore designed for domestic purposes have their heating elements exposed to injury from food or grease dripping upon said elements. One of the objects of my invention is to provide a cooking stove whose heating elements are protected from such injury and are therefore free from all fouling matter to develop their maximum heat. I also purpose simplifying the construction of electric domestic cooking stoves, reducing their cost of manufacture and operation, increasing their efficiency and rendering them easier to be manipulated.

In general, my preferred method of achieving conservation of the heat is using diatomaceous earth or asbesto-sponge-felt as a heat-insulating material, with a centrally disposed air chamber, providing heat insulating members to limit the radiation of heat from the top portion of the stove and providing a sectional door in connection with a divisional reflector member to prevent the escape of heat from the lower portion of the oven when admission is desired only to the upper portion. In protecting the heating elements I provide in addition to the metal sheet top, trough-like members or coil guards over each heating coil, which members or guards also serve to distribute the heat.

The above mentioned general objects of my invention, together with others inhering in the same, are attained by the mechanism illustrated in the drawings, the same being merely preferred exemplary forms of embodiment of my invention, throughout which drawings like reference numerals indicate like parts.

Fig. 3, is a front view of the same with oven door closed;

Fig. 4, is a side view of the oven door and the means of securing said door in closed position;

Fig. 5, is a side view of a grill provided with a ratchet and pinion.

Figure 1:
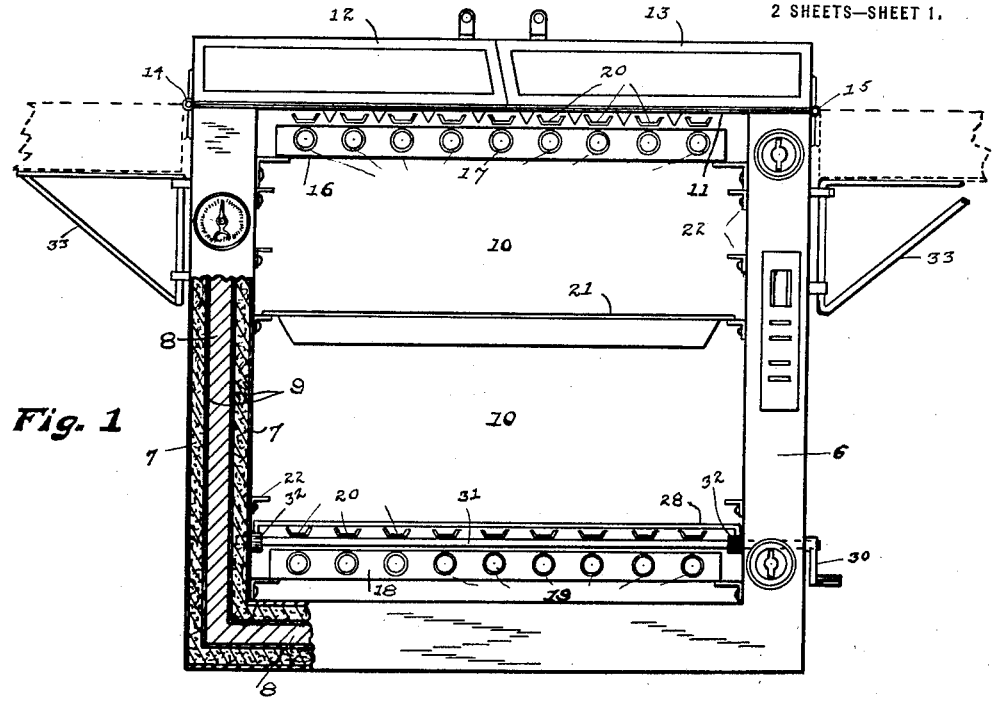
Figure 1, is a front view of an electric stove embodying my invention with the oven door removed and a portion of the wall cut away to show the heat-insulating wall construction.
Figure 2:
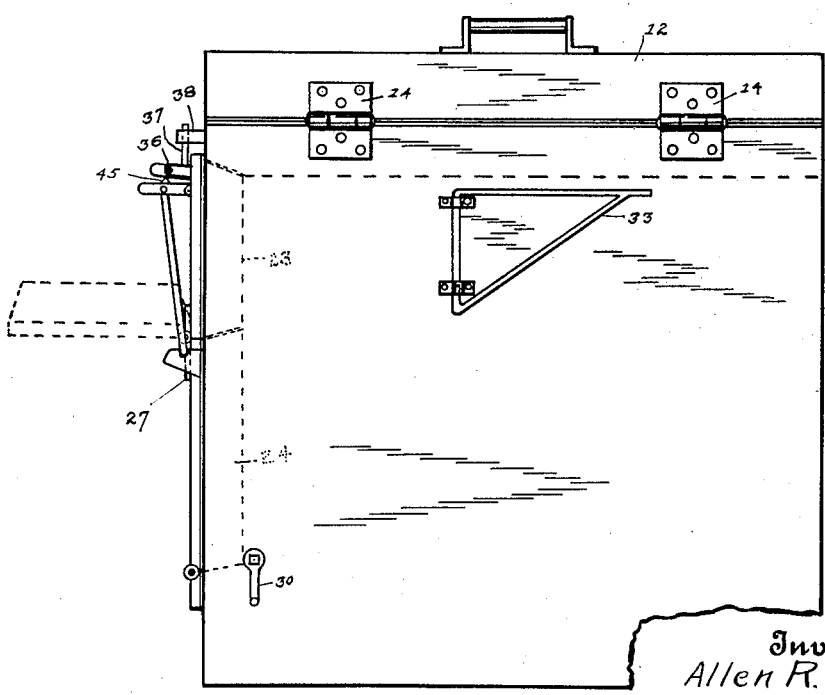
Fig. 2, is a side view of an oven embodying my invention.

A heat insulating wall 6 is formed preferably with diatomaceous earth or asbesto-sponge-felt 7, including an air space 8, formed by inserting insulating material such as asbestocel. Asbestocel is a trade name designating a structure formed of corrugated sheets of asbestos confined between two sheets of asbestos. One or more of such confined corrugated asbestos sheets may be superimposed to build up a structure of the desired thickness. I find that such insulating material as asbestocel disintegrates when placed next to a wall which is directly subject to heat of the intensity of baking temperatures. Asbesto-sponge-felt or diatomaceous earth are preferably placed next to the strongest heat, while such material as asbestocel may be conveniently used to form the air space 8 and thus avoid the expense of inserting a metal wall as the division 9 between the diatomaceous earth and the air space 8. These walls inclose the oven space 10 which has the heavy sheet metal top 11, electrically insulated, said top serving as the support for cooking vessels. Heat insulating members 12 and 13, preferably in the form of doors, hinged at 14 and 15 are adapted to rest upon the top of the sheet metal top 11. Immediately beneath the said top 11 is the electric heating element 16, composed of the coils 17. In the bottom portion of the oven space is the heating element 18, composed of the coils 19, similar to those composing the element 16. Above each of the coils 17 and 19 is preferably arranged a trough like coil-guard 20. The metal top 11 is preferably provided with the usual pan holes and lids such as are commonly found in an ordinary oil stove.

A removable division-reflector member 21, preferably in the form of a drip pan rests on lateral hanger supports 22 which supports are arranged in pairs at different levels. The reflector member 21 serves to reflect the heat respectively from the upper and the lower heating elements 16 and 18 respectively, and serves as a division wall between the lower and upper portions of the oven.

A heat-insulated walled oven door comprised of sections 23 and 24 which are hinged together at 25 and hingedly connected to the stove at 26 serve to close the front of the oven space. An eccentrically pivoted plate 27 functions to brace the doors when it is desired to open both sections at the same time as one door.

A grill 28 may be provided with a ratchet section 29 and may be moved in and out by means of the crank 30, when applied to the rod 31 which is provided with the pinions 32. The bracket 33 serves to support the members 12 and 13 when in open position.

Handle bar 34 is supported by bars 35 pivoted at 36 which bars are also connected to the latches 37 so that when the bar 34 is lifted up, the said latches 37 are pulled out of the recesses 38, whereby the door is unloosened as respects the upper section 23. Handle bar 39 with its supports 40, pivoted at 41 serves to lift the bar 42 out of the recesses 43 by means of the connecting members 44. Bumpers 45 carried on supports 40 serve to connect the operation of the two handle bars 34 and 39 when it is desired to open the entire door. Obviously, when handle bar 39 is lifted it not only lifts bar 42 but, through the bumper 45 it forces up bar 34 which as above explained withdraws the latches 37.

The operation of my electric stove is as follows: The heat insulated walls formed with the intervening air space serves so effectively to retain the heat that even when operated at very high temperatures the exterior of the stove is but slightly warmed and hence the heat is effectively conserved so that the cost of operation is lowered and the important advantage is secured in that such a stove so insulated does not make the room uncomfortably warm in the summer time. My construction makes possible the use of two heating elements of such design that they can be cheaply manufactured, thus avoiding the use of expensive segregated coils. The heat insulating members 12 and 13 also serve to prevent the heat from escaping when resting on the metal top 11 in closed position. When it is desired to use only one-half of the stove top for boiling or frying purposes, one of the heat insulating members 12 or 13 may be allowed to remain resting on the top 11 and thereby prevent the heat from radiating from that portion of the stove top. By providing the metal top 11 an effective protection is afforded the coils 17 and 19 from food falling thereupon when accidentally allowed to boil over. Coil guards 20 serve to protect the coils when exposed by removing the lids from the pan holes in the sheet metal top. At the same time, the said metal top may be rendered very hot by having the same subject to the heat of all the coils 17 even when only a portion of the space of said sheet metal top 11 is desired to be exposed to the support of the cooking vessels. Since the radiation of heat is prevented by the heat insulating members 12 and 13, the sheet metal top 11 serves to collect the heat of the heating coils 17 and with the coöperation of said heat insulating members 12 and 13 functions in concentrating said heat in the portion exposed. The members 12 and 13 may also be used as a warming shelf when thrown back to rest on the bracket 32. Moreover, by providing the door in two sections, it is possible to position the divisional-reflector 21 opposite the hinge 24 level, and allow the opening of the upper section without interrupting the operation of the lower portion of the oven by permitting the heat to escape, and in this wise the heat is further conserved.

Obviously, changes may be made in the forms, dimensions and arrangements of the parts of my invention without departing from the principle thereof, the above setting forth merely a preferred form of embodiment.

I claim:—

1. An electric cooking stove for domestic purposes, embodying an oven provided with heat-insulated side and bottom walls and provided with a cooking vessel supporting top formed of a sheet of metal electrically insulated, electric heating coils located immediately below said sheet of metal, electric heating coils located in the bottom portion of said oven, and removable heat-insulating members adapted to rest upon said top sheet of metal and disposed to limit the radiation of heat from said sheet of metal.

2. An electric cooking stove for domestic purposes, embodying an oven provided with heat-insulated side and bottom walls and provided with a cooking vessel supporting top formed of a sheet of metal electrically insulated, electric heating coils located immediately below said sheet of metal, electric heating coils located in the bottom portion of said oven, removable heat-insulating members adapted to rest upon said top sheet of metal and disposed to limit the radiation of heat from said sheet of metal, and a division-reflector member.

3. An electric cooking stove for domestic purposes, embodying an oven provided with heat-insulated side and bottom walls and provided with a cooking vessel supporting top formed of a sheet of metal electrically insulated, electric heating coils located immediately below said sheet of metal, electric heating coils located in the bottom portion of said oven, removable heat-insulating members adapted to rest upon said top sheet of metal and disposed to limit the radiation of heat from said sheet of metal, a division-reflector member and a sectional oven door whereby access may be had to the portion of the oven above said division-reflector without permitting the heat to escape from that portion of the oven below said division-reflector.

4. An electric cooking stove for domestic purposes, embodying an oven provided with heat-insulated side and bottom walls and provided with a cooking vessel supporting top formed of a sheet of metal electrically insulated, electric heating coils located immediately below said sheet of metal, electric heating coils located in the bottom portion of said oven, removable heat-insulating members adapted to rest upon said top sheet of metal and disposed to limit the radiation of heat from said sheet of metal, a division-reflector member and a sectional oven door whereby access may be had to the portion of the oven above said division-reflector without permitting the heat to escape from that portion of the oven below said division-reflector, and means on said stove whereby said heat insulating members are held as warming shelves.

5. An electric cooking stove for domestic purposes, embodying an oven provided with heat-insulated side and bottom walls and provided with a cooking vessel supporting top formed of a sheet of metal electrically insulated, electric heating coils located immediately below said sheet of metal, electric heating coils located in the bottom portion of said oven, trough-like guards whereby said electric coils are protected and the heat dispersed, removable heat-insulating members adapted to rest upon said top sheet of metal and disposed to limit the radiation of heat from said sheet of metal, a division-reflector member and a sectional oven door whereby access may be had to the portion of the oven above said division-reflector without permitting the heat to escape from that portion of the oven below said division-reflector.

In witness whereof, I hereunto subscribe my name this 26th day of June, A. D., 1919.

ALLEN R. ROSS.